United States Patent
Schwandt et al.

(10) Patent No.: US 10,090,633 B2
(45) Date of Patent: Oct. 2, 2018

(54) DIFFUSION COOLED GAS LASER ARRANGEMENT AND METHOD FOR SETTING THE DISCHARGE DISTRIBUTION IN THE CASE OF DIFFUSION COOLED GAS LASER ARRANGEMENT

(71) Applicant: TRUMPF Laser- und Systemtechnik GmbH, Ditzingen (DE)

(72) Inventors: Markus Schwandt, Korntal-Muenchingen (DE); Stefan Knupfer, Hoefingen (DE); Gerold Mahr, Korntal-Muenchingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 14/732,353

(22) Filed: Jun. 5, 2015

(65) Prior Publication Data
US 2015/0270678 A1 Sep. 24, 2015

Related U.S. Application Data

(63) Continuation of application No. PCT/EP2013/003679, filed on Dec. 5, 2013.

(30) Foreign Application Priority Data

Dec. 6, 2012 (DE) .................. 10 2012 222 469

(51) Int. Cl.
*H01S 3/038* (2006.01)
*H01S 3/097* (2006.01)
*H01S 3/223* (2006.01)

(52) U.S. Cl.
CPC .............. *H01S 3/097* (2013.01); *H01S 3/038* (2013.01); *H01S 3/0388* (2013.01); *H01S 3/2232* (2013.01)

(58) Field of Classification Search
CPC ........ H01S 3/038; H01S 3/0388; H01S 3/097; H01S 3/2232
See application file for complete search history.

(56) References Cited

U.S. PATENT DOCUMENTS

| 4,686,682 A | 8/1987 | Haruta et al. |
| 4,719,639 A | 1/1988 | Tulip |

(Continued)

FOREIGN PATENT DOCUMENTS

| DE | 102011003147 B3 | 4/2012 |
| EP | 0525823 B1 | 2/1995 |

(Continued)

OTHER PUBLICATIONS

International Search Report for corresponding PCT Application No. PCT/EP2013/003679, dated Feb. 24, 2014, 6 pages.

*Primary Examiner* — Marcia Golub-Miller
(74) *Attorney, Agent, or Firm* — Fish & Richardson P.C.

(57) ABSTRACT

A diffusion-cooled gas laser system that includes a first and a second electrode and a discharge gap arranged between the electrodes, wherein a dielectric is arranged on at least one of the electrodes on the discharge-gap side. The system is characterized in that the dielectric thickness $d/\in_{res}$ the dielectric for influencing the discharge $\in_{res}$ of distribution in the discharge gap varies along at least one dimension of the electrode on which the dielectric is arranged, wherein d is the thickness of the dielectric, and $\in_{res}$ is the resultant constant of the dielectric, and, at its thickest point, has a thickness of at least 1 mm or is greater than one hundredth of the length of the electrode or is greater than one thousandth of a wavelength determined by the frequency of a radiofrequency electrical power to be coupled into the system.

20 Claims, 3 Drawing Sheets

(56) References Cited

U.S. PATENT DOCUMENTS

| | | | |
|---|---|---|---|
| 5,479,428 | A | 12/1995 | Kuzumoto et al. |
| 6,704,333 | B2 | 3/2004 | Tulip |
| 7,755,452 | B2 | 7/2010 | Knickerbocker et al. |
| 7,778,303 | B2 | 8/2010 | Villarreal-Saucedo et al. |
| 7,970,037 | B2 | 6/2011 | Hauer et al. |
| 8,913,642 | B2 | 12/2014 | Engel et al. |
| 2001/0050937 | A1 | 12/2001 | Hori et al. |
| 2003/0042436 | A1 | 3/2003 | Hori et al. |
| 2003/0098398 | A1 | 5/2003 | Tsuchida |
| 2006/0029116 | A1 | 2/2006 | Shackleton et al. |
| 2012/0106586 | A1 | 5/2012 | Villarreal-Saucedo et al. |

FOREIGN PATENT DOCUMENTS

| | | |
|---|---|---|
| EP | 0275023 B1 | 10/1995 |
| EP | 1217700 B1 | 10/2004 |
| EP | 2750023 A1 | 7/2014 |
| JP | 03159181 A | 7/1991 |
| JP | 2001-237475 | 8/2001 |

DIFFUSION COOLED GAS LASER ARRANGEMENT AND METHOD FOR SETTING THE DISCHARGE DISTRIBUTION IN THE CASE OF DIFFUSION COOLED GAS LASER ARRANGEMENT

CROSS-REFERENCE TO RELATED APPLICATIONS

This application is a continuation of and claims priority under 35 U.S.C. §120 to PCT Application No. PCT/EP2013/003679 filed on Dec. 5, 2013, which claims priority to German Application No. DE 10 2012 222 469.6, filed on Dec. 6, 2012. The contents of both of these priority applications are hereby incorporated by reference in their entirety.

TECHNICAL FIELD

The present disclosure relates to laser systems and in particular to diffusion-cooled gas laser systems

BACKGROUND

Industrial laser designs may be selected in such a way that the greatest degree of effectiveness possible and maximum performance are realized. The effectiveness and performance are impacted by the ability of a laser system to discharge unwanted heat. The discharge of unwanted heat can be realized through diffusion onto cooled walls and can also be realized by means of circulating laser gas.

Gas laser implementations, in particular $CO_2$ lasers, benefit from uniform gas discharging. Accordingly, voltage changes across the length of the laser may be disadvantageous. Various laser systems provide additional inductances located between the internal electrode and the external electrode of the laser to minimize voltage changes and promote uniform gas discharging. However, these additional inductance increase production complexities and increased laser production costs.

SUMMARY

Particular embodiments described herein provide laser systems that advantageously provide diffusion-cooled gas laser embodiments that promote unified discharge distribution. In particular embodiments, the laser systems includes a first electrode and a second electrode, as well as a discharge gap located between the electrodes. The laser systems also include a dielectric element that is located on at least one of the electrodes on the discharge gap side. The laser systems include a power input configured to electrically couple a power source to at least one of the first and second electrodes. The power input is configured to spatially couple a high-frequency power source to one of the electrodes. The dielectric element is configured to have a dielectric thickness ratio of $d/\in_{res}$ that decreases increasingly along a length of the laser in a direction away from the power source such that the dielectric constant is configured to vary the discharge distribution in the discharge gap along the length of the laser. The d is the thickness of the dielectric element and $\in_{res}$ is the resulting dielectric constant of the dielectric field. In particular embodiments, the dielectric element has a thickness of at least 1 mm or greater than a hundredth of the length of at least one of the first electrode and the second electrode, or greater than a thousandth of a wavelength determined by the frequency of an electric high-frequency power to be coupled to the power input.

Further embodiments, provide methods for setting the discharge distribution in a diffusion-cooled gas laser system including a first and a second electrode, a discharge gap located between the electrodes, a dielectric located on at least one of the electrodes on the discharge gap side, and a high-frequency power source spatially coupled into the discharge gap.

In particular embodiments, the gas laser system comprises resonator mirrors on the front of the facing electrodes, which reflect the laser beam and hold it inside the gas laser system.

High-performance lasers as describe herein with light power of more than 500 W can be used for laser processing, for example for marking metals or non-metals, for cutting, welding and processing materials, such as for example metals, in accordance with particular embodiments.

As discussed further herein, various embodiments include a diffusion-cooled gas laser system with a first and a second electrode, a discharge gap located between the electrodes, and one or more dielectric elements located on at least one of the electrodes on the discharge gap side, whereby the dielectric thickness ratio $d/\in_{res}$ the one or more dielectric elements varies for influencing the discharge distribution in the discharge gap along at least one dimension, in particular across the area of the electrode on which the dielectric is located. The factor d is the thickness of the one or more dielectric elements and $\in_{res}$ is the resulting dielectric constant of the one or more dielectric elements. The dielectric thickness ratio $d/\in_{res}$ of the dielectric element is here defined as the quotient of the thickness d of the dielectric element and the resulting dielectric constant $\in_{res}$ of the dielectric element.

The resulting dielectric constant is determined by the dielectric constants of the materials present in a given position between the electrode and the discharge gap. With the diffusion-cooled gas laser system according to various embodiments a circulation of the laser gas can be omitted, as the same can be cooled by means of diffusion-cooling via the walls of the laser. By varying the dielectric thickness along at least one dimension, in particular across the area of the electrode, disclosed embodiments are configured to set the temperature distribution of the laser medium (the gas) along at least one dimension, in particular across the area of the electrode. In particular, the temperature distribution can be set (vis-à-vis the one or more dielectric elements) in such a way that it is substantially constant along at least one dimension, in particular across the area of the electrode. Setting the dielectric thickness in accordance with embodiments disclosed herein permits, but is not limited to, implementation of a laser system without additional inductances.

In accordance with various embodiments describe herein, a laser system may be configured to operate with a temperature profile that is set with an increasing or decreasing distribution along at least one dimension, in particular across the area of the electrode. By adjusting or setting the dielectric thickness it is possible to adapt the distribution of the coupled electric power in such a way that a desired temperature distribution of the gas in the discharge gap occurs. The term "dimension" as used herein should be understood to include a direction, which can be a straight direction along an axis or also a circumferential direction, namely arced or curved, for example with a cylindrical electrode.

In particular, the one or more dielectric elements can comprise a variation of the resulting dielectric constant $\in_{res}$ along at least one dimension, in particular across the area of the electrode, which influences the dielectric thickness of the one or more dielectric elements. A predetermined distribution of the resulting dielectric constant $\in_{res}$ in particular can be set in accordance with various embodiments.

Alternatively and/or additionally the dielectric thickness can be influenced in that the dielectric element comprises a variation in thickness along at least one dimension, in particular across the area of the electrode, which influences the dielectric thickness of one or more dielectric elements. In order to set the dielectric thickness either the thickness d and/or the resulting dielectric constant $\in_{res}$ can therefore be influenced, in accordance with particular embodiments. For example, the dielectric constant can be set in particular embodiments by selecting and/or varying the materials used to manufacture the dielectric element.

The distribution of the dielectric thickness along at least one dimension, in particular across the area of the electrode, can be stepless, continuous, or linear, in accordance with particular embodiments. Alternatively, the distribution of the dielectric thickness along at least one dimension, in particular across the area of the electrode, can be stepped, discontinuous, or non-linear, in accordance with particular embodiments. In example embodiments, the steps can be of equal or different lengths, heights and/or widths. Various distributions of the dielectric thickness along at least one dimension, in particular across the area of the electrode, can thus be set. With a stepped distribution of the dielectric thickness, the distribution can in particular embodiments have more than two steps, more than three steps, or more than seven steps. In this way, a clearly more uniform setting of the temperature is made possible.

One way of setting the dielectric thickness results when the dielectric comprises at least two material components with different dielectric constants $\in_r$, whereby the thickness of at least one material component varies along at least one dimension, in particular across the area of the electrode. This results in a varying resulting dielectric thickness in the direction of the discharge gap, in particular in a direction vertical to the surface of the electrode.

At least one material component can be distributed across the entire electrode area. The electrode area can thus be additionally protected against corrosion.

At least one material component can comprise a constant distribution of the dielectric constant across the electrode area. This represents a cost-effective variant. The variation of the dielectric thickness can be realized by means of the second material component.

Electrical power is two-dimensionally coupled into the discharge gap at a high frequency (high-frequency power) in the gas laser system. In particular embodiments, the frequency lies within a range of between 1 MHz and 300 MHz, e.g., between 10 MHz and 100 MHz, or between 70 MHz and 90 MHz. The coupled electrical power is greater than 2 kW, in particular embodiments. The spatial expansion of the electrode areas is at least 500 mm in length and at least 300 mm in width, in particular embodiments. Such a minimum size for the electrodes may be implemented to generate particularly high laser powers. The device with the distribution of the dielectric thickness along at least one dimension, in particular across the area of the electrode, has the additional advantageous effect that a wavelength dependent spatial distribution of the electric field strength can be set in the discharge gap. A very consistent distribution of the electric field strength in particular can be set, which is desirable for optimum use of electric power. This functions particularly well if the distribution of the resulting dielectric constant is varied and if the spatial expansion of the dielectric is changed along at least one dimension, in particular across the area of the electrode.

At least one material component can comprise a varying thickness along one dimension, in particular across the area of the electrode.

According to one embodiment the dielectric can comprise at least two material components with different dielectric constants $\in_r$, whereby the material components, in particular in layers, are arranged one above the other in the direction of the discharge gap, and the thickness ratio of the at least two material components varies along at least one dimension, in particular across the area of the electrode. In this case, the resulting dielectric constant $\in_{res}$ results from the dielectric constants of the material layers in the direction of the discharge gap, in particular vertical to the electrode surface.

For setting the dielectric thickness, the dielectric may comprise at least two material components with different dielectric constants $\in_r$, whereby one material component is enclosed by the other material component, or is delimited by the same, in at least one area. One material component can, in particular embodiments, be completely enclosed by the other material component in one area. The enclosed material component can take on different geometric shapes here. It is also feasible that air, for example, is enclosed as one material component in the other material component. Air inclusions can therefore be used in a targeted way for setting the dielectric thickness.

It is of particular advantage for laser applications if the dielectric comprises one or more of the materials water, ceramic, PTFE, air, or polyethylene. These materials have very different dielectric constants, so that a combination of several of these materials will enable the setting of a dielectric thickness in a particularly easy and targeted way. Water can, for example, also be used for additional cooling.

A further advantage results from the use of a first solid material component that encloses a further, non-solid material component, i.e., a fluid, or delimits the space of the latter. The fluid can then also be used for additional cooling, in accordance with particular embodiments. Water has proven itself as a particularly advantageous fluid, as it has a relatively high dielectric constant of more than 50, and is not negatively chemically changed by the high-frequency power used.

The use of water can be advantageous, in particular in connection with coaxial lasers, if a power input is provided centrally to electrically couple a power source to an electrode and the resulting dielectric constant $\in_{res}$ of the dielectric component falls towards the end of the electrode, in particular steadily decreasing, for the central power input. With this measure a consistent temperature distribution along the length of the laser and dielectric element can be realized.

Alternatively, it can be provided that at one electrode a power input is provided at one of the two ends of the electrode, and the resulting dielectric constant $\in_{res}$ of the dielectric falls from the central power input towards the edge of the electrode, in particular steadily. The electric power, in particular the high-frequency power in the range described above, can be coupled particularly uniformly in this way.

A central power input can further be provided on an electrode, and the resulting dielectric constant $\in_{res}$ of the dielectric element can increase (and conversely the dielectric thickness ratio $d/\in_{res}$ can decrease), in particular steadily, from the central power input towards the edge of the electrode.

A power input can further be provided on an electrode at one of the two ends of the electrodes, and the resulting dielectric constant $\in_{res}$ can increase, in particular steadily, from the central power input towards the edge of the electrode. In this case a central power input and a power input at the edge will be present.

The gas laser system can be designed as a slab laser. This design is characterized by two electrodes extending mostly on a level. The laser beam is often guided by the electrodes in such systems. With the distribution of the dielectric thickness the power couplings and the temperature distribution can be set.

The gas laser system can be designed as a coaxial laser. Such systems may be characterized in that one electrode is provided as an internal conductor, and one electrode as an external conductor in a cylindrical arrangement. The laser beam is often not guided by the electrodes in such systems, but can expand freely in the way of a so-called free beam within the gas discharge chamber. This means that the laser beam is not guided by a geometric system, for example the electrodes themselves, but expands freely between the electrodes within the gas discharge chamber. Such a beam normally forms in a concave fashion. It expands towards the resonator mirrors and has a small spatial expansion between the resonator mirrors.

If the distance of the electrodes along the at least one dimension, in particular across the area of the electrode, varies, a discharge gap can be set, whose width is variable. It is possible to set the shape of the beam in a targeted way with this measure. With free laser beams it is possible to realize an improved coupling of the power with this arrangement.

For this at least one electrode can comprise a surface, the cross-section of which is hyperbolic, that faces the other electrode. The opposing electrode can be level, or can also comprise a hyperbolic cross-section. With a coaxial laser the electrode surface can comprise a hyperbolic surface when viewed in cross-section.

At least one material component can comprise a thickness that varies across the electrode area and is adjusted to suit the spatial expansion of the beam. In this way, power can be coupled even more uniformly. The spatial expansion of the at least one material component is adjusted well to the concave laser beam if it has a convex structure itself, with a thicker expansion in the center of the electrode than at the edge of the electrode. The shape can be stepped over a number of steps or be stepless, hyperbolic, or elliptical.

It can further be provided that the surfaces of the two electrodes are arranged parallel with each other.

The dielectric can have a thickness of at least 1 mm at its thickest point. An even greater thickness of at least 5 mm is of advantage. Still greater thicknesses of at least 10 mm have been found to be of particular advantage. The thickness should in particular be greater than one hundredth of the length of the electrodes of the gas laser system. A thickness that is greater than one thousandth of the wavelength determined by the frequency of the coupled high-frequency power has also been found to be of particular advantage. With such thicknesses, and in particular when coupling high-frequency power in the ranges described above, an undesired coupling power distribution on the surface of the electrodes, resulting on the basis of wavelength effects, can be counteracted. As already mentioned, certain minimum areas are required for the electrodes for high laser powers. To be able to realize diffusion-cooled lasers, the electrically coupled energy must be converted into laser light with the minimum amount of loss possible. For this a frequency within the ranges described above is particularly well suited. However, standing waves will already form at frequencies of between 10 MHz and 100 MHz on an electrode area, the length of which is greater than 500 mm. This effect can be counteracted by means of an arrangement with a varying dielectric thickness.

A further advantage results at a minimum thickness of the dielectric of 1 mm, 5 mm, or 10 mm. When the gas discharge is designed, which is in turn necessary for designing the laser beam, an edge layer forms between the laser beam and the electrodes, or between the laser beam and the dielectric material. This edge layer comprises a capacity and an inductivity, which both influence the electric power coupling. As a result this leads to the wavelength becoming shorter. This will also increase the undesired effects of forming standing waves. This effect can also be counteracted by the arrangement with a varying dielectric thickness. A minimum thickness of the dielectric will be necessary for this, which can also be determined according to the dimensions of the electrodes and the wavelength of the coupled HF power as described above.

Also part of the scope of the invention is a method for setting the discharge distribution in the case of a diffusion-cooled gas laser system with a first electrode and second electrode, as well as discharge gap located between the electrodes, whereby a dielectric is located on at least one of the electrodes on the discharge gap side, where high-frequency power is two-dimensionally coupled into the discharge gap, whereby the distribution of the two-dimensionally coupled HF power is set in that the dielectric thickness $d/\in_{res}$ of the dielectric is set to influence the discharge distribution in the discharge gap, whereby d is the thickness of the dielectric, and $\in_{res}$ the resulting dielectric constant of the dielectric.

The resulting dielectric constant can be set by means of the combination of material components with different dielectric constants Fr as described herein.

The distribution of the dielectric thickness can further be set by means of the combination of material components with different geometric shapes. For these embodiments, different two-dimensional geometric shapes or three-dimensional geometric shapes can be set. A material component can in particular also be enclosed in a three-dimensional shape of another material component.

A predetermined, for example, a constant, temperature distribution of the discharge across the discharge gap, in particular along the length of the discharge gap, can be set by setting the dielectric thickness.

Alternatively, a predetermined gain distribution can be set across the discharge gap by setting the dielectric thickness.

The dielectric thickness of the dielectric can also be set in that at least two dielectric material layers are used, one above the other when viewed from the direction of the discharge gap, whereby the thickness of at least one material layer is varied along at least one dimension, in particular across the area of the electrode that carries the dielectric.

Further characteristics and advantages of the invention result from the following description of an embodiment example of the invention, from the figures of the drawing showing the major details of the invention, and from the claims. Individual characteristics can each be realized separately or as a part of several in any combination for any variant of the invention.

An embodiment of the invention is schematically illustrated in the drawings and is explained in detail below with reference to the figures of the drawing.

DESCRIPTION OF DRAWINGS

FIG. 2 is an enlarged section of the diffusion-cooled gas laser system of FIG. 1a.

DETAILED DESCRIPTION

Figure 1A:
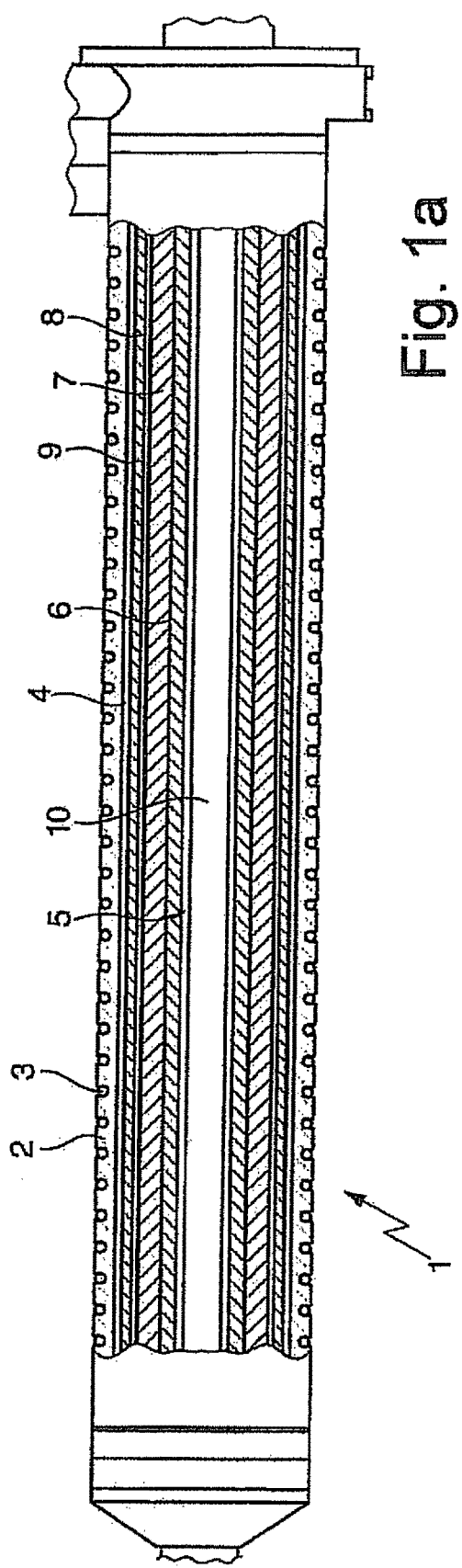
FIG. 1a is a partial cross-section through a diffusion-cooled gas laser system according to various embodiments of the invention.

FIG. 1a shows a diffusion-cooled gas laser system 1 in a partial cross-sectional illustration. The gas laser system 1 comprises an external electrode 2, in which cooling tubes 3 for a coolant are arranged. The external electrode 2 is made of metal and connected to earth. The discharge gap 4 is located directly below the electrode 2. The second electrode is identified with reference number 5.

A dielectric element comprising several material layers is located above this second electrode 5. A water layer 6 is first arranged on the electrode 5. Above this a material layer 7 consisting, e.g., of PTFE is located. Above this a material layer 8 consisting of water is in turn located, which is followed by a material layer 9 made of ceramic. The dielectric element on the discharge gap side of the electrode 5 in this embodiment therefore consists of four different materials, which each have their own dielectric constant $\in_r$. A variation of the dielectric thickness $d/\in_{res}$ results from a thickness of the dielectric element, which is not shown here, but is instead shown only in the enlarged illustration of FIG. 2, that differs across the area or the length of the electrode in this embodiment.

It is also clear from FIG. 1a that the power input electrically coupling the power source to electrode 5 is located centrally in position 10 in relation to the length of electrode 5.

Figure 1B:
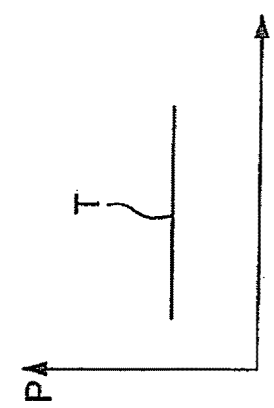
FIG. 1b is a resulting power and temperature distribution of a coaxial laser without setting the dielectric thickness for a central power input in relation to the length.
Figure 1C:
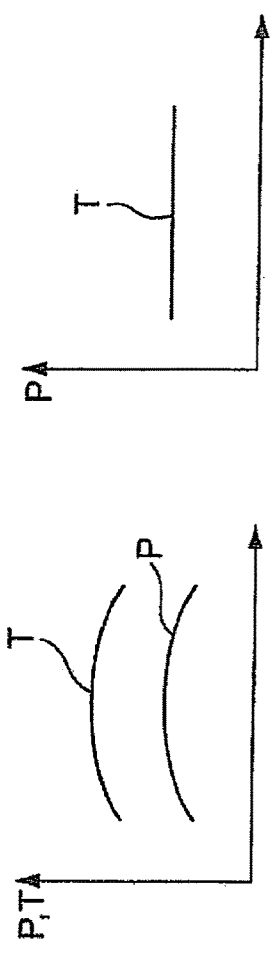
FIG. 1c is a desired temperature distribution of a coaxial laser.

With a coaxial laser like the one shown in FIG. 1a, power distribution according to diagram 1b results from a central input of power. This means that the power is at a maximum at the input and then falls again towards both ends of the coaxial laser. This also leads to a temperature profile T, as shown in FIG. 1b. However, it is the temperature profile T illustrated in FIG. 1c that is desired, i.e., a constant temperature across the length of the laser. This is achieved by setting the dielectric thickness across the length of the gas laser, or across the area of the electrode 5.

Figure 2:
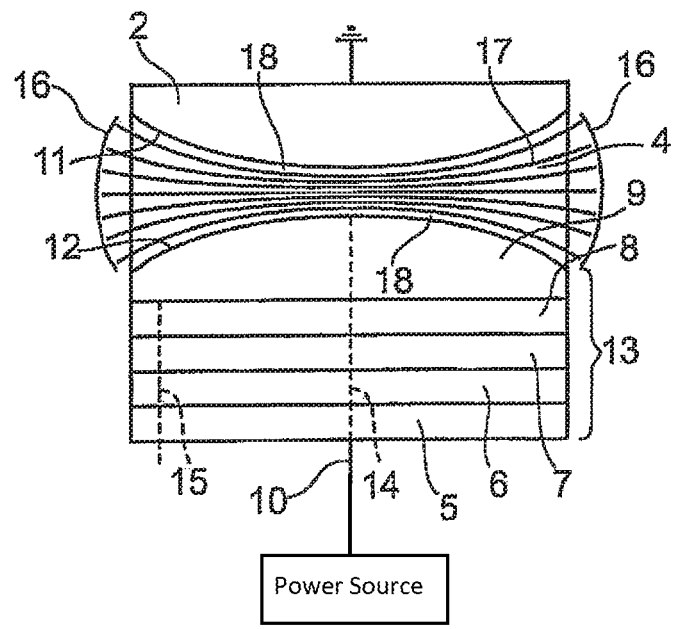

It can be seen from the illustration in FIG. 2 that the surface 11 of the electrode 2 as well as the surface 12 of the dielectric element 13, in particular of material layer 9, is arced. In the embodiment shown the surfaces of electrode 2 and of material layer 9, and therefore that of the dielectric element 13, display a hyperbolic arc in cross-section. As a consequence of this the dielectric thickness along the broken line 14, i.e., in the center of the electrode 5 in relation to its length is different from that along the broken line 15, i.e., at the end of the laser. With this measure and the selection of suitable materials 6-9 the power distribution, and therefore the temperature distribution, can be set across the length of the gas laser system in such a way that a constant temperature results across the length of the laser and the dielectric element.

In FIG. 2 the resonator mirrors 16 and the laser beam 17, which expands in a concave fashion between the resonator mirrors 16, are also shown. The edge layer 18 abuts between the laser beam 17 and the sides of the electrode 2 or the material layer 9 facing the laser beam 17.

If power were not supplied in position 10, as illustrated in FIG. 1a, but at one end, the dielectric thickness would have to be set differently to maintain a constant temperature distribution.

Figure 3:
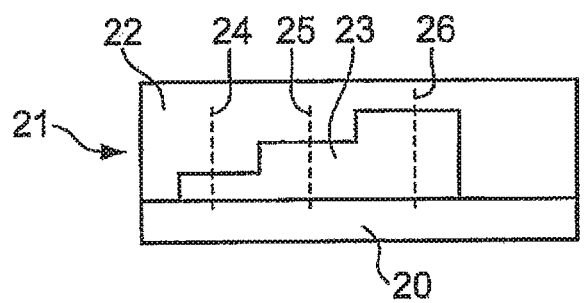
FIG. 3 is a cross-sectional illustration through an electrode with two different material layers that form the dielectric.

FIG. 3 shows a cross-sectional illustration through an electrode 20, on which a dielectric 21 is located. The dielectric 21 comprises a first material layer 22 and a second material layer 23. The second material layer 23 is embedded into the first material layer 22 and progresses in steps. This means that the dielectric thicknesses are different along the lines 24, 25, 26, as the relevant dielectric constants $\in_r$ of the first and second material 22, 23 make different contributions towards the resulting dielectric constant $\in_{res}$.

Figure 4:
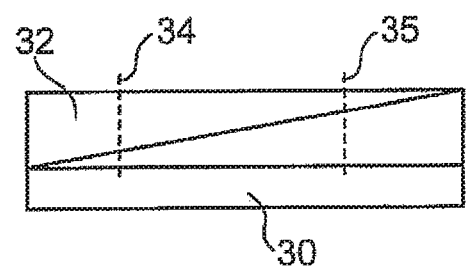
FIG. 4 is a cross-sectional illustration through an electrode with a dielectric that consists of two materials, whereby the thickness of the materials changes continuously along the at least one dimension of the electrodes.

In the illustration of FIG. 4 an electrode 30, on which a dielectric element 31 comprising a first material 32 and a second material 33 is located, is shown. The thickness of the first material 32 as well as that of the second material 33 changes continuously across the length of the electrode 30, and therefore also along at least one dimension of the electrode 30. This results in different dielectric thicknesses along the lines 34, 35, as the contributions of the materials 32, 33, with their respective different $\in_r$, towards the resulting dielectric thickness vary.

Figure 5:
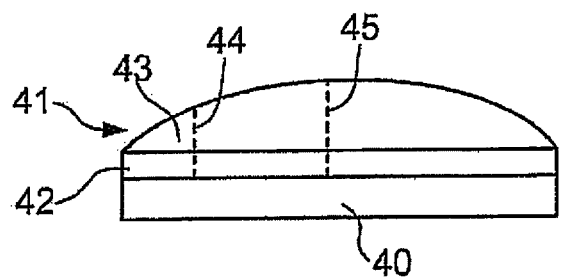
FIG. 5 is a further cross-sectional illustration through an electrode with a dielectric, whereby a material layer comprises a different thickness along at least one dimension of the electrode.

An electrode 40 supporting a dielectric element 41 on the discharge gap side is shown in FIG. 5. It consists of two materials 42, 43, whereby material layer 42 has a constant thickness and material layer 43 has a hyperbolic shape. The thickness of the dielectric element layer 43 therefore varies across the length or area of the electrode 40. Different dielectric element thicknesses therefore result along the broken lines 44, 45.

Figure 6:
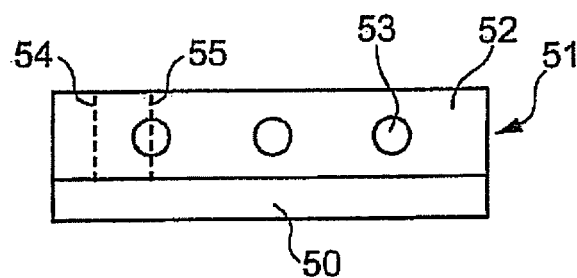
FIG. 6 is a cross-sectional illustration through an electrode with a dielectric, whereby a second material layer is embedded in the first material layer.

An electrode 50 comprising a dielectric element 51 is shown in FIG. 6. The dielectric element 51 comprises a first material 52 and a second material 53, whereby the second material 53 is completely enclosed within the first material 52, and is in particular of a spherical shape. The second material 53 could, for example, consist of spherical air inclusions. As a consequence of this configuration, the dielectric element thickness along the lines 54, 55 differs.

Figure 7:
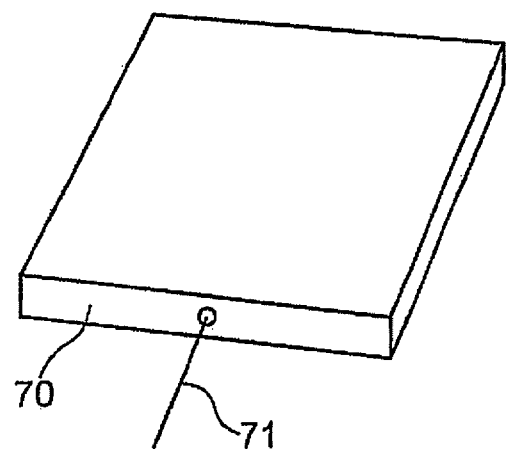
FIG. 7 is an electrode with an input that is central to the width.

FIG. 7 shows an electrode 70 such as might for example be used with a slab laser. An input 71 that is central to the width of the electrode 70 is shown here, which is however located at one end in relation to the length of the electrode 70.

Figure 8:
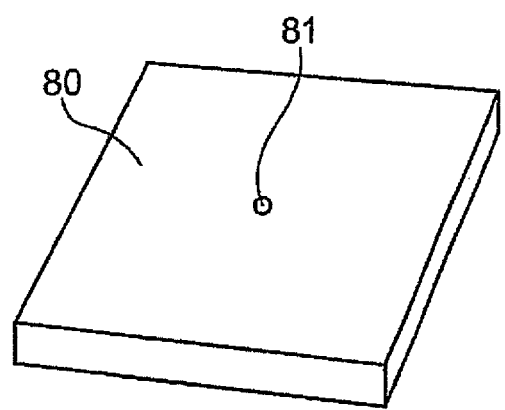
FIG. 8 is an electrode with an input that is central to the area.

An alternative input is shown for the electrode 80 in FIG. 8, where a central input in relation to the area of the electrode is realized at point 81.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A diffusion-cooled gas laser system comprising:
a first electrode extending from a first end to a second end along a length of the diffusion-cooled gas laser system;
a second electrode extending from the first end to the second end, wherein the second electrode is connected to the first electrode such that a discharge gap is positioned between the first electrode and the second electrode along the length, wherein the diffusion-cooled gas laser system is configured to form a laser beam in the discharge gap, wherein the laser beam has a spatial expansion along at least a portion of the length;
at least one dielectric element arranged on at least one of the first electrode and the second electrode, wherein the at least one dielectric element comprises at least two material components each having a different dielectric constant with respect to one another, whereby a non-zero/positive thickness of at least one material component of the at least two material components increases from a first non-zero thickness to a second non-zero thickness along at least a portion of the length of the electrode, the increase from the first non-zero thickness to the second non-zero thickness adapted to the spatial expansion of the laser beam; and
a power input configured to electrically couple a power source to at least one of the first electrode and the second electrode intermediate the first end and the second end,
wherein a dielectric thickness ratio $d/\epsilon_{res}$ of the at least one dielectric element varies of along a length of the at least one dielectric element in a direction away from the power input, whereby d is the thickness of the at least one dielectric element and $\epsilon_{res}$ is the resulting dielectric constant of the combined dielectric constants of each of the at least two material components in the at least one dielectric element.

2. The diffusion-cooled gas laser system according to claim 1, wherein the at least one dielectric element comprises a variation of the dielectric constant $\epsilon_{res}$ along at least one dimension of the electrode, which influences the dielectric thickness ratio of the at least one dielectric element.

3. The diffusion-cooled gas laser system according claim 1, wherein the distribution of the dielectric thickness ratio along at least one dimension of the electrode is stepless.

4. The diffusion-cooled gas laser system according claim 1, wherein the distribution of the dielectric thickness ratio along at least one dimension of the electrode is stepped with at least two steps.

5. The diffusion-cooled gas laser system according to claim 1, wherein the at least one dielectric element comprises at least two material components each having a different dielectric constant with respect to one another, whereby the material components are arranged one above the other in the direction of the discharge gap and the dielectric thickness ratio $d/\epsilon_{res}$ of the at least two material components varies along at least one dimension of the electrode.

6. The diffusion-cooled gas laser system according to claim 1, wherein the at least one dielectric element comprises at least two material components each having a different dielectric constant with respect to one another, whereby one material component is enclosed by the other material component, or is delimited by the other material component, in at least one area.

7. The diffusion-cooled gas laser system according to claim 1, wherein the at least one dielectric element comprises one or more of the materials water, ceramic, PTFE, air, and polyethylene.

8. The diffusion-cooled gas laser system according to claim 1, wherein the at least one dielectric element comprises a thickness that varies across the electrode area, wherein the at least one dielectric element is adapted to the spatial expansion of the beam with a convex structure and with an expansion that is thicker in the center of the electrodes than at the edge of the electrodes.

9. The diffusion-cooled gas laser system according to claim 1, wherein the at least one dielectric element comprises a solid material component that encloses a further non-solid material component.

10. The diffusion-cooled gas laser system according to claim 1, wherein the power input is provided centrally on one electrode and the dielectric constant $\epsilon_{res}$ of the dielectric increases from the power input towards the edge of the electrode.

11. The diffusion-cooled gas laser system according to claim 1, wherein the gas laser system is designed as a slab laser that guides the laser beam by the electrodes.

12. The diffusion-cooled gas laser system according to claim 1, wherein the distance between the electrodes varies in at least one dimension.

13. The diffusion-cooled gas laser system according to claim 1, wherein the distance between the electrodes varies across the area of the electrodes.

14. The diffusion-cooled gas laser system according to claim 1, wherein the power source is two-dimensionally coupled into the discharge gap at a high frequency, whereby the frequency lies within a range of between at least one of 1 MHz and 300 MHz, 10 MHz and 100 MHz, and 70 MHz and 90 MHz.

15. The diffusion-cooled gas laser system according to claim 14, wherein the coupled electric power is greater than 2 kW.

16. The diffusion-cooled gas laser system according to claim 15, wherein the spatial expansion of at least one electrode area of the at least one electrode is at least 500 mm in length.

17. The diffusion-cooled gas laser system according to claim 1, wherein the dielectric thickness ratio $d/\epsilon_{res}$ of the at least one dielectric element increases along a length of the dielectric element in a direction away from the power input.

18. The diffusion-cooled gas laser system according to claim 1, wherein the dielectric element is arcuate in a direction along the length.

19. The diffusion-cooled gas laser system according to claim 1, wherein the dielectric distribution in the discharge gap is at least one of continuous and linear.

20. The diffusion-cooled gas laser system according to claim 1, wherein the dielectric element has a thickness of at least one of: 1 mm, greater than a hundredth of the length of at least one of the first electrode and the second electrode, and greater than a thousandth of a wavelength determined by the frequency of an electric high-frequency power source configured for coupling via the power input.

* * * * *

UNITED STATES PATENT AND TRADEMARK OFFICE
CERTIFICATE OF CORRECTION

PATENT NO. : 10,090,633 B2  
APPLICATION NO. : 14/732353  
DATED : October 2, 2018  
INVENTOR(S) : Markus Schwandt, Stefan Knupfer and Gerold Mahr Page 1 of 1

It is certified that error appears in the above-identified patent and that said Letters Patent is hereby corrected as shown below:

On the Title Page

Column 1 (Title), Line 1, delete "DIFFUSION COOLED" and insert -- DIFFUSION-COOLED --  
Column 1 (Title), Line 4, delete "DIFFUSION COOLED" and insert -- DIFFUSION-COOLED --

Column 2 (Abstract), Line 5, after "d/$\epsilon_{res}$" insert -- of --  
Column 2 (Abstract), Line 6, after "discharge" delete "$\epsilon_{res}$ of"

In the Specification

Column 1  
Line 1, delete "DIFFUSION COOLED" and insert -- DIFFUSION-COOLED --  
Line 4, delete "DIFFUSION COOLED" and insert -- DIFFUSION-COOLED --

In the Claims

Column 9  
Line 34, in Claim 1, after "varies" delete "of"  
Line 46, in Claim 3, after "according" insert -- to --  
Line 49, in Claim 4, after "according" insert -- to --

Signed and Sealed this  
Twenty-ninth Day of October, 2019

Andrei Iancu  
*Director of the United States Patent and Trademark Office*